Patented July 13, 1948

2,444,984

UNITED STATES PATENT OFFICE 2,444,984

STABILIZED LECITHIN

William J. Fitzpatrick, Chicago, Ill., assignor to The W. J. Fitzpatrick Company, Chicago, Ill., a corporation of Illinois No Drawing. Application July 21, 1943, Serial No. 495,627

3 Claims. (Cl. 99—15)

This invention relates to a lecithin product and a method of preparing the same, and more particularly to a stabilized lecithin product for use with food materials.

Lecithin has long been known in the art as a substance which produces desirable effects in various food products. Lecithin is known as an excellent emulsifying agent and is very useful in producing relatively stable emulsions. In addition, lecithin is edible and completely non-toxic.

It has been used with great success in the bakery, where it has been found that the addition of a small quantity of lecithin to the dough provides a more uniform porous structure in the product, a good crust formation, and better retention of freshness. Similarly, the addition of a small amount of lecithin to shortening increases its creaming qualities, prevents any tendency to spot or streak after standing, and otherwise increases the effectiveness of the shortening.

Although lecithin is extremely valuable in food products, its use has been somewhat limited by the difficulty of incorporating it in the product. Commercial lecithin is principally derived from soy beans, and is usually marketed in a semi-solid mass, varying in physical characteristics from that of a wax to that of a tacky viscous material and containing from about 40% to 75% of lecithin and about 60% to 25% oil. Since lecithin is normally used in food products in very small quantities, it is obvious that it is somewhat difficult to distribute it uniformly through a bulky food material.

Various methods of incorporating lecithin in food products have been suggested. For example, lecithin has been mixed with flour as a carrier. Another and more satisfactory method is the incorporation of a small quantity of lecithin in granular water-soluble materials, such as common salt and sugar, which are used as food products.

The product to which the invention is particularly applicable is preferably one in which the lecithin is distributed on the surface of a carrier, such as common salt, which is in a very finely divided state. The lecithin may first be mixed with the common salt in a proportion of not more than 5% of lecithin to 95% of the common salt. The mixture, which is a greasy mass, may then be comminuted or subjected to grinding to form a mixture containing very finely divided particles which is a dry, free-pouring powder, free from any tendency to cake or pack.

As set forth in greater detail in copending application, Serial No. 283,378, now Patent No. 2,334,401, filed by me and Harold H. Wagner for Food product and method of making, common salt and lecithin may be roughly mixed in the ratio of 25 parts of salt to one part of commercial lecithin by weight. The mixture of salt and lecithin produces a greasy mass, which is then subjected to a distributing operation. Various types of mixers or grinders may be used for this operation. I have obtained excellent results by passing the mass through the comminuting machine, more particularly described and claimed in the copending application of Harold H. Wagner, Serial No. 272,208, now Patent No. 2,345,779, filed May 6, 1939, although other machines probably are equally as satisfactory. The comminuting operation distributes the lecithin uniformly on the salt and serves simultaneously to grind or break up the salt crystals, resulting in an increase in the number of crystals. The resulting product is a granular amount of relatively fine salt crystals carrying lecithin uniformly distributed throughout. The crystals have a dry feel and exhibit little or no tendency to lump or pack.

It has been found that when the lecithin mixture is stored for long periods of time, the pH of the product tends to progressively decrease. At the same time, the lecithin tends to develop a sharp acrid odor. In time the odor may become so pronounced that the lecithin may be said to be rancid.

The change in the pH of lecithin mixed with a granular food carrier is illustrated by tests made on a lecithin-common salt mixture containing about 96% of salt and about 4% of lecithin. The salt and lecithin were comminuted together to intimately mix the materials and to reduce the salt to particles of an extremely fine state of division. The mixture formed was a dry, free-pouring powder substantially free from any tendency to cake or pack. At the time of mixing the pH of the mixture was 4.5. Two months later the pH had decreased to 3.9, and five months after the mixing the pH had fallen to 3.6.

It may be that the tendency towards rancidity and a progressively decreasing pH of the material are due to a decomposition of the lecithin molecule to liberate substantial quantities of free fatty acids such as oleic acid. On the other hand, these effects may be due to changes in or decomposition of the oil which is found in commercial lecithin. At any rate, the product does tend to become rancid and the pH thereof does progressively decrease over long periods of time.

Not only does this action affect the odor of the product, but it also tends to decrease the effectiveness of the lecithin as an emulsifying agent. The optimum pH for lecithin as an emulsifying agent is approximately 6.4. As the pH is lowered from this value, the emulsify-power of the lecithin is diminished.

The present invention contemplates the formation of a product in which lecithin is mixed with finely divided particles of a granular water soluble material as a carrier to form a dry finepouring powder substantially free of any tendency to cake or pack and in which the pH is maintained above 4.5 and rancidity avoided even though the product is stored for long periods of time.

I have found that by mixing a small quantity of an alkaline substance with the lecithin mixture the pH may readily be increased to above 6.0, preferably to between 6.0 and 6.5, while at the same time rancidity of the lecithin is prevented. Any suitable alkaline substance may be used, but I have found that alkaline salts, and particularly salts of a metal of the group consisting of the alkali metals and the alkaline earths are well adapted for my purpose.

By an alkaline salt I mean a salt which gives an alkaline reaction in water solution; for example, a salt of a strong base and a weak acid. The alkaline salts of the metals of the alkaline earth group are suitable for this purpose, and of these salts I prefer to use a salt of magnesium such as the carbonate. It is also possible to use alkaline substances other than salts, such, for example, as the oxides and their hydrates. Thus, magnesium oxide may readily be substituted for magnesium carbonate. Other compounds which may be used include calcium phosphate, calcium carbonate, calcium citrate, sodium acetate, sodium benzoate, potassium acetate, and barium oxide.

The lecithin may be mixed with the granular water soluble food carrier, such as common salt or sugar in any suitable proportions. Between 1% and 4% of lecithin by weight may be mixed with the food carrier. Preferably, approximately 4% of lecithin is used. The quantity of lecithin should not be substantially in excess of 5% by weight, since in the quantities larger than this amount difficulty is encountered in forming a dry, free-pouring powder which is substantially free from any tendency to cake or pack. When the lecithin and the granular water soluble food carrier have been mixed together the mixture is subjected to a grinding or comminuting operation to intimately mix the ingredients and to reduce the granules of the water soluble food carrier to an extremely fine state of division. In this form the mixture is dry and free-pouring and does not cake or pack even after standing for long periods of time.

The quantities of the alkaline substance which may be used may vary considerably according to the particular substance which is chosen and the lecithin food carrier mixture in which it is to be incorporated. Between ½% and 1% by weight of the alkaline substance with respect to the mixture is preferably used. Any quantity of alkaline substance in excess of 4% by weight of the mixture has been found to add no further stability as to rancidity and accordingly, the quantity used should be less than 4%. However, at least ½% of the alkaline substance should be used in order to obtain the desired stabilizing action.

The pH of the mixture is preferably between 6.0 and 6.5 and may, for example, be 6.4. The minimum pH for the mixture should be at least 4.5.

The introduction of a small quantity of an alkaline susbtance into a common salt-lecithin mixture produces marked effects in the material. Not only is the pH gradually raised to a value above 6.0, but the resulting product may be stored indefinitely without danger of rancidity. A sample containing by weight 95.47% of sodium chloride, 3.82% of vegetable lecithin, and .71% of magnesium carbonate was found to have a pH of 5.5 shortly after the mixing of the ingredients, and a pH of 6.7 about three months after the mixing. No trace of rancidity could be detected even after a period of many months.

When the alkaline substance is to be mixed with lecithin and a carrier, it may be incorporated in the carrier prior to the mixing operation. The lecithin may then be incorporated in the mixture. If the lecithin is to be used in a food product, as is ordinarily the case, care must be taken to use only alkaline substances which are non-toxic.

The addition of such a material as magnesium carbonate in finely divided form has been found to possess another advantage in the case of a sugar carrier for the lecithin. The added substance in this event appears to prevent, or at least to decrease the formation of lumps in the sugar, and thus provides a more readily handled material.

The effect of preventing rancidity in the lecithin product and of stabilizing the pH thereof at a relatively high value may be due to the formation of salts of the fatty acids liberated by the lecithin. For example, when magnesium carbonate is used with the lecithin product, magnesium salts of the fatty acids may be formed. The formation of such salts would increase with the quantity of fatty acid liberated. In this manner, as fast as the lecithin saponified, the free fatty acids would be removed by reaction with the alkaline substance.

Although this theory may explain the action of the alkaline substance in the lecithin product, I do not wish to be bound by it, since, regardless of the theory of the reaction, the beneficial results are nevertheless produced in the lecithin product.

The introduction of the alkaline material into a mixture of lecithin and a water soluble granular food carrier, such as common salt, has been found to be effective in stabilizing the mixture against rancidity when the mixture is in the form of dry free-pouring powder as above set forth. If the salt or other food carrier is in the form of such large particles or granules or if the lecithin is present in such a quantity as to provide a greasy, sticky mix, then the mixture may develop characteristics of rancidity even though the alkaline material is present. Accordingly, the present invention is applicable to dry freepouring mixtures of lecithin with a water soluble granular food carrier.

This application is a continuation-in-part of my abandoned copending application, Serial No. 336,585, filed May 22, 1940, for Lecithin product and method of preparing the same.

The foregoing specific examples have been given for the purpose of illustrating the invention and means of practicing it. Changes and modifications may, therefore, be made in the process and product as set forth, particularly as to nature and quantities of the products used and as to conditions of the process, without departing from the spirit and scope of my invention as set forth in the appended claims, in which it is intended to claim all novelty inherent in the invention as broadly as permissible in view of the prior art.

I claim:

1. A stabilized lecithin product of high emulsifying power adapted to remain free from rancidity for long periods of time consisting essentially of finely divided granules of water soluble food material, each having a thin film of lecithin thereon to form a dry free-pouring powder free from any tendency to cake or pack and having intimately admixed therewith and uniformly distributed therethrough, a non-toxic slightly alkaline substance in finely powdered form, the lecithin being approximately 4% by weight of the total mixture and the non-toxic slightly alkaline substance being approximately ½% to 1% by weight of the total mixture, the mixture having a pH of at least 4.5

2. A stabilized lecithin product of high emulsifying power adapted to remain free from rancidity for long periods of time consisting essentially of finely divided granules of salt, each having a thin film of lecithin thereon to form a dry free-pouring powder substantially free from any tendency to cake or pack and having intimately admixed therewith and uniformly distributed therethrough a non-toxic slightly alkaline substance in finely powdered form, the lecithin being approximately 4% by weight of the total mixture and the non-toxic slightly alkaline substance being approximately one-half percent to 1% by weight of the total mixture, the mixture having a pH of at least 4.5.

3. A stabilized lecithin product of high emulsifying power adapted to remain free from rancidity for long periods of time consisting essentially of finely divided granules of salt, each having a thin film of lecithin thereon to form a dry free-pouring powder substantially free from any tendency to cake or pack and having intimately admixed therewith and uniformly distributed therethrough magnesium carbonate in finely powdered form, the lecithin being not in excess of 5% by weight of the total mixture and the magnesium carbonate being not in excess of 4% by weight of the total mixture, the mixture having a pH of at least 4.5.

WILLIAM J. FITZPATRICK.

REFERENCES CITED

The following references are of record in the file of this patent:

UNITED STATES PATENTS

| Number | Name | Date |
|---|---|---|
| 1,150,691 | Martin | Aug. 17, 1915 |
| 2,032,612 | Griffith | Mar. 3, 1936 |
| 2,057,695 | Schwieger | Oct. 20, 1936 |
| 2,198,214 | Musher | Apr. 23, 1940 |
| 2,271,409 | Thurman | Jan. 27, 1942 |
| 2,272,616 | Thurman | Feb. 10, 1942 |
| 2,334,401 | Fitzpatrick et al. | Nov. 16, 1943 |

FOREIGN PATENTS

| Number | Country | Date |
|---|---|---|
| 518,103 | Great Britain | Feb. 16, 1940 |